United States Patent [19]
Thomas

[11] Patent Number: 5,777,452
[45] Date of Patent: Jul. 7, 1998

[54] CORRECTOR, APPARATUS, AND A METHOD FOR CONTROLLING THE ELECTROMAGNETIC TORQUE OF AN ASYNCHRONOUS MACHINE

[75] Inventor: Jean-Luc Thomas, Thomery, France

[73] Assignee: Alcatel Alsthom Compagnie Generale D'Electricite, Paris, France

[21] Appl. No.: 737,166

[22] PCT Filed: Feb. 29, 1996

[86] PCT No.: PCT/FR96/00317

§ 371 Date: Nov. 5, 1996

§ 102(e) Date: Nov. 5, 1996

[87] PCT Pub. No.: WO96/28884

PCT Pub. Date: Sep. 19, 1996

[30] Foreign Application Priority Data

Mar. 9, 1995 [FR] France .................. 95 02768

[51] Int. Cl.[6] .................................................. H02P 21/00
[52] U.S. Cl. ................................... 318/809; 318/799
[58] Field of Search .............................. 318/798, 799, 318/800, 801, 807, 808, 809

[56] References Cited

U.S. PATENT DOCUMENTS 3,851,234  11/1974  Hoffman et al. .
4,215,305  7/1980  D'Atre et al. .................... 318/803
4,677,360  6/1987  Garces ............................. 318/803
5,144,216  9/1992  De Doncker ..................... 318/807
5,296,794  3/1994  Lang et al. .

OTHER PUBLICATIONS

X. Roboam et al. "Controle d'une machine asynchroone par estimation robuste de la vitesse", *Journal De Physique*, vol. 2, No. 3, Paris, France pp. 439–453, Mar. 1992.

*Primary Examiner*—Bentsu Ro
*Attorney, Agent, or Firm*—Sughrue, Mion, Zinn, Macpeak & Seas, PLLC

[57] ABSTRACT

Apparatus and method for controlling the electromagnetic torque of an asynchronous machine. The apparatus includes a corrector which controls the electromagnetic torque of an asynchronous machine by regulating the magnetic flux and by controlling the electromagnetic torque $C_m$, the corrector including a regulator circuit (3) for regulating the rotor magnetic flux $\phi_r$, having non-linear control using input/output linearization by static looping and whose output controls the d-component of the stator current $i_{sd}$, a first linear corrector (1) of the proportional, integral type whose output v is the input to the regulator circuit, and a second linear corrector (2) of the proportional, integral type whose output controls the angular frequency of the rotor currents $\omega_{s1}$.

11 Claims, 2 Drawing Sheets

CORRECTOR, APPARATUS, AND A METHOD FOR CONTROLLING THE ELECTROMAGNETIC TORQUE OF AN ASYNCHRONOUS MACHINE

This application is a continuation, under requirement of 35 USC 371, of an international application PCT/FR96/00317, filed Feb. 29, 1996.

BACKGROUND OF THE INVENTION

The present invention relates to apparatuses for controlling asynchronous machines in general, and more particularly it relates to a corrector, to apparatus, and to a method for controlling the electromagnetic torque of an asynchronous machine.

Speed control of an asynchronous machine is generally performed by regulating the rotor or stator flux and by controlling the electromagnetic torque.

The power supply magnitudes fed to the asynchronous machine, i.e. the voltages or currents fed thereto, are delivered by a variable frequency inverter of the voltage source type or of the current source type, which inverter generates power signals that are pulse-width modulated.

Values for flux and for torque are magnitudes that are reconstructed by known electrical means on the basis of measured stator voltage and current.

For a long time, research in the field of apparatuses for controlling asynchronous machines has been directed to increasing the dynamic performance of such control apparatuses.

Nowadays, the performance of such control apparatuses, generally as defined by the response time of the electromagnetic torque, is found to be satisfactory in most industrial and railway applications.

The concept of "robustness" now appears as an additional criterion concerning the performance of apparatuses for controlling asynchronous machines.

The term "robustness" of a control structure is used to mean the potential of said control structure for remaining insensitive to disturbances, e.g. due to errors in models or to variations in parameters.

One of the known technical solutions that is well adapted to solving the problem of robustness in apparatuses for controlling the electromagnetic torque of an asynchronous machine is based firstly on modelling with the singular disturbances of the Park model, and secondly on the initial orientation of the rotating frame of reference concerning stator current.

Because that solution uses linear control relationships, it has the drawback that in the apparatuses for controlling the electromagnetic torque of the asynchronous machine, robustness is favored to the detriment of performance.

Also, when the control relationships used are purely non-linear, then the robustness of such control apparatuses is not assured.

The thesis presented by Xavier ROBOAM to Institut National Polytechnique de Toulouse, entitled "Variateur de vitesse pour machine asynchrone" [Variable speed controller for an asynchronous machine], which INPT thesis was published in 1991, relates to developing robust control relationships and to controlling speed without using a mechanical sensor.

The described variable speed controller for an asynchronous machine relies on implanting robust digital control relationships and on reconstituting fundamental magnitudes that are unmeasured, namely: stator flux, speed, and torque.

The drawbacks of the variable speed controller for an asynchronous machine as described in that document are:

linear control of the modulus of the stator flux, with adjustment that is empirical;

linear control of the electromagnetic torque which is applicable essentially at small values for the angular frequency of rotor currents; and a the dynamic range of the closed loop response of the torque loop is insufficient.

The corrector and the apparatus of the invention for controlling the electromagnetic torque of an asynchronous machine differ from the variable speed controller described in that document, in that:

the stator flux magnitude is replaced by the rotor flux magnitude, thus making it possible to perform non-linear control of the input/output linearization type in order to guarantee maximum dynamic performance;

the robustness of flux regulation is ensured by a corrector of the proportional, integral "without zero" type located upstream from the non-linear control relationship;

the electromagnetic torque is controlled by associating a linear corrector in order to obtain a better performance/robustness compromise over torque control; and the flux singularity on starting, i.e. the way current tends to increase to infinity on starting, is lifted by means of an appropriate limitation.

The document "Contrôle d'une machine asynchrone par estimation robuste de la vitesse" [Controlling an asynchronous machine by robust speed estimation], published at pages 439 to 453 of the March 1992 number of Journal de Physique, by Xavier ROBOAM et al., adds to the above-cited document and gives the results obtained as a function of the disturbances to which the variable controller is subjected.

The proposed solution relies on rotor flux regulation by means of a dynamic relationship that does not take parameter robustness into account, and in particular robustness in the face of variation in mutual inductance $x_m$.

The results obtained show essentially the good performance in reconstructing speed and flux.

However that solution does not consider problems of dynamic performance and robustness of torque and flux control.

Those documents are based on initializing the rotating frame of reference, i.e.: the (d,q) frame of reference, on the stator current vector of the asynchronous machine.

It results from such initialization and from the fact that the d-axis and the q-axis of the rotating two-phase frame of reference are in quadrature, that:

the value of the component on the q-axis of the stator current, written $i_{sq}$ is zero, $i_{sq}=0$, as is its derivative with respect to time, $di_{sq}/dt=0$; and the value of the component on the d-axis of the stator current, written $i_{sd}$, is equal to the modulus of the stator current $i_s$.

It stems from the above that robustness is introduced because the frame of reference is oriented on an accurate and reliable measurement of the stator current $i_s$, which is not the case when the d-axis of the rotating frame of reference is initially oriented on the axis of the rotor or stator flux of the asynchronous machine, since those magnitudes are not measured magnitudes, unlike the stator current which is.

OBJECT'S AND SUMMARY OF THE INVENTION

Thus, an object of the invention is to provide a corrector and apparatus for controlling the speed of an asynchronous machine that is insensitive to disturbances, mainly to uncertainties in the model and to variations in parameters.

In other words, an object of the invention is to increase the robustness of the control relationships of apparatuses for controlling the speed of asynchronous machines, by minimizing deterioration in dynamic performance.

It follows from the above that an object of the invention is to find a better compromise between performance and robustness during flux regulation and control of the electromagnetic torque of the asynchronous machine.

Another object of the invention is to provide apparatus for controlling the electromagnetic torque of an asynchronous machine in which adjustment of the flux corrector is not done by means of an empirical method.

According to the invention, the corrector for controlling the electromagnetic torque of an asynchronous machine by regulating the magnetic flux $\phi$ and by controlling the electromagnetic torque $C_m$ is characterized by:

a regulator circuit for regulating the rotor magnetic flux $\phi_r$, having non-linear control using input/output linearization by static looping, defined by the equation:

$$i_{sd}^* = \frac{1}{x_m} \frac{\phi_r^{2*}}{\phi_{rd}}$$

in which:

$i_{sd}^*$ is the stator current reference value on the d-axis;
$\phi_r^{2*}$ is the reference value for the modulus of the rotor flux;
$\phi_{rd}$ is the d-component of the rotor flux;
$x_m$ is the [magnetizing or] mutual inductance; and in which the output controlled the d-component of the stator current $i_s^*$;

a first linear corrector of the proportional, integral type whose output $\underline{v}$ is the input of said regulator circuit; and a second linear corrector of the proportional, integral type whose output controls the angular frequency of the rotor currents $\omega_{sl}$.

The corrector of the invention for controlling the electromagnetic torque of an asynchronous machine by regulating the magnetic flux $\phi$ and by controlling the electromagnetic torque $C_m$ also satisfies one of the following characteristics:

the second corrector further includes a non-linearizing control circuit defined by the equation:

$$\omega_{sl} = \left\{ \frac{A_c^*}{B_c} \left(\frac{1}{\theta}\right) - \frac{A_c}{B_c} \right\} C_m + \frac{B_c^*}{B_c} \left(\frac{1}{\theta}\right) v_{cm}$$

$$\theta = \frac{\phi_r^{2*}}{\phi_{rd}^2}, \quad A_c^* = -\frac{1}{\tau_r}, \quad B_c^* = \frac{1}{\tau_r}$$

with $$A_c = -\frac{1}{\tau_r}, \quad B_c = \frac{\omega_{SN}\phi_r^{2*}}{\tau_r}$$

in which:

$\theta$ is the parameter characterizing the operating point in torque;
$v_{cm}$ is the input of said corrector;
$\tau_r$ is the rotor time constant;
$\omega_{SN}$ is the nominal stator angular frequency;
$x_r$ is the rotor reactance; and the input thereof is defined by the output $v_{cm}$ of said second corrector and its output controls the angular frequency of the rotor currents $\omega_{sl}$;

the flux regulator circuit is defined by the equation:

$$i_{sd}^* = \frac{1}{x_m} \frac{\phi_r^{2*}}{sat(\hat{\phi}_{rd})}$$

in which the function $sat(\hat{\phi}_{rd})$ is a non-linear limiting function defined by the following system of equations:

$$sat(\hat{\phi}_{rd}) = \begin{cases} \hat{\phi}_{rd} & \text{if } \hat{\phi}_{rd} > \phi_{rdmin} \\ \phi_{rdmin} & \text{if } \hat{\phi}_{rd} \leq \phi_{rdmin} \end{cases}$$

with $$\phi_{rdmin} = \frac{1}{x_m} \frac{\phi_{rN}^2}{I_{smax}}$$

in which:

$\phi_{rN}^2$ is the nominal rotor flux;
$I_{smax}$ is the maximum current that can be accepted by the converter and/or the asynchronous machine;

the flux regulator circuit is defined by the equation:

$$i_{sd}^* = \frac{1}{x_m(\phi_r^{2*}, \hat{i}_{mr})} \frac{\phi_r^{2*}}{sat(\hat{\phi}_{rd})}$$

in which:

$\hat{i}_{mr}$ is the estimate of the magnetizing current; and
$x_m(\phi_r^{2*}, \hat{i}_{mr})$ is a function that results from identification of the static characteristic of magnetization; and the output of each of the first and second correctors is the difference between a proportional action and an integral action, said integral action being the result of taking the difference between the reference $\phi_r^{2*}$ and the estimated flux $\hat{\phi}_r^2$ and weighting it by a gain $k_i$ or taking the difference between the reference $C_m^*$ and the estimated torque $\hat{C}_m$ and weighting it by a gain $k_{ic}$, and said proportional action being the result of weighting the estimated flux $\hat{\phi}_r^2$ by a gain $k_p$, or weighting the estimated torque $\hat{C}_m$ by a gain $k_{pc}$.

According to the invention, apparatus for controlling the electromagnetic torque of an asynchronous machine by regulating the magnetic flux $\phi$ and by controlling the electromagnetic torque $C_m$, which apparatus is constituted by control means associated with a power source and a corrector $K_{ext}$, is characterized in that the corrector $K_{ext}$ is as defined above.

In such a device, the asynchronous machine is controlled by a voltage power supply, with said voltage power supply being current looped by a third corrector $K_{int}$ disposed in cascade with said corrector $K_{ext}$.

According to the invention, the method of controlling the electromagnetic torque of an asynchronous machine by regulating the magnetic flux $\phi$ and by controlling the electromagnetic torque $C_m$, by means of apparatus constituted by control means associated with a power source and a corrector $K_{ext}$ as defined above, is characterized in that it comprises the steps consisting in:

regulating the rotor magnetic flux $\phi_r$ by means of a non-linearly controlled regulator circuit using input/output linearization by means of a static loop;

performing integral action and then proportional action so as to obtain the input variable $\underline{v}$ of said regulator circuit; and performing integral action and then proportional action so as to control the angular frequency of the rotor currents $\omega_{sl}$.

The method of the invention may include one of the following steps consisting in:

completing said integral then proportional action for controlling said angular frequency of the rotor currents $\omega_{sl}$ by a linearizing control relationship in such a manner as to be unaffected by variations in the operating point of said asynchronous machine;

fixing a maximum current value while starting said asynchronous machine or while operating under defluxed conditions; and adapting the static mutual reactance $x_m$ in such a manner as to be unaffected by variation therein during operation of said asynchronous machine under defluxed conditions.

An advantage of the corrector, the apparatus, and the method of the invention for controlling the electromagnetic torque of an asynchronous machine is to propose a better compromise between dynamic performance and robustness of flux regulation and of electromagnetic torque control.

This advantage is due firstly to the fact that the dynamic performance is obtained by using non-linear control relationships, and secondly to the fact that the robustness results from implementing proportional integral "without zero" type correctors disposed upstream from the non-linear control relationships.

Another advantage of the corrector, the apparatus, and the method of the invention for controlling the electromagnetic torque of an asynchronous machine is that they enable the flux singularity on starting the asynchronous machine to be avoided in implicit manner.

BRIEF DESCRIPTION OF THE DRAWING

Other objects, characteristics, and advantages of the invention appear on reading the description of preferred embodiments of the corrector and of the apparatus for controlling the electromagnetic torque of an asynchronous machine, which description is given with reference to the accompanying drawings, in which.

DETAILED DESCRIPTION OF THE INVENTION

Figure 1:
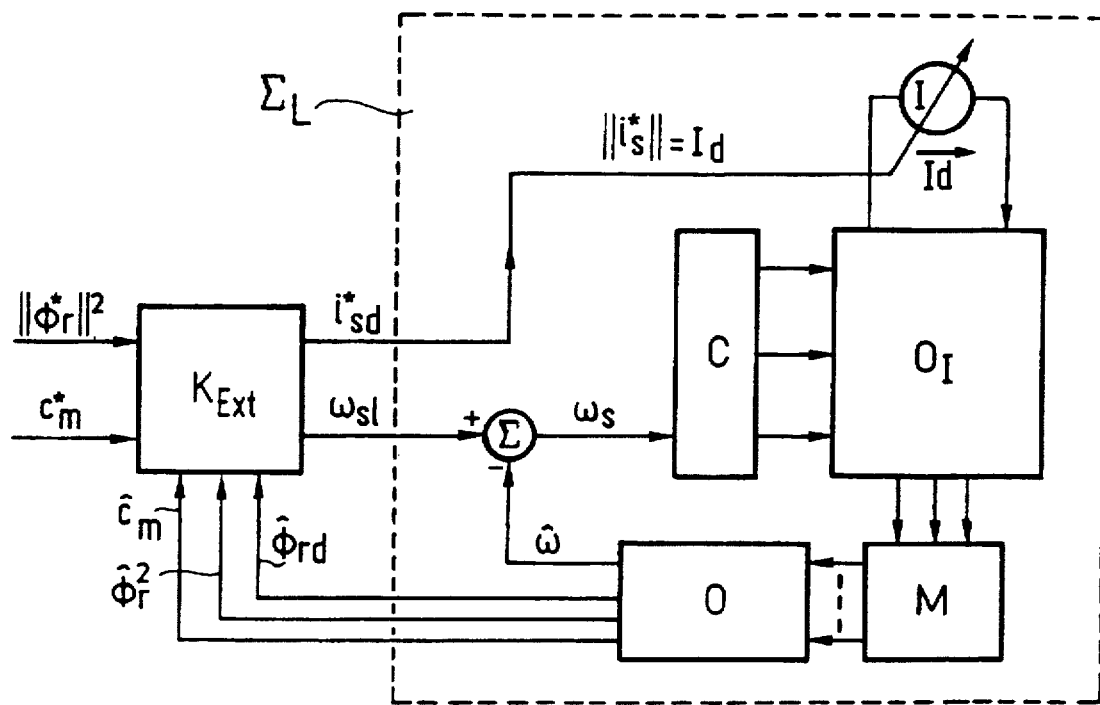
FIG. 1 is an overall diagram of a known structure for apparatus for controlling the electromagnetic torque of an asynchronous machine comprising an assembly $\Sigma_L$ based on a current actuator $I_d$ and a corrector $K_{ext}$ of the invention.

FIG. 1 is an overall diagram of a known structure for apparatus for controlling the electromagnetic torque of an asynchronous machine comprising an assembly $\Sigma_L$ based on a current actuator $I_d$ together with a corrector $K_{ext}$ of the invention.

As shown in the overall diagram of FIG. 1, the prior art assembly $\Sigma_L$ comprises an asynchronous motor M of the three-phase type powered by a current inverter $O_I$ which is associated with pulse width modulated control means C and a controlled current source $I_d$.

Values for the flux and the torque of the asynchronous machine are reconstituted using a method known in the prior art by means of an observer O.

The reconstructed values for the flux and the torque of the asynchronous machine are applied to the corrector $K_{ext}$ of the invention, which in turn supplies control values for the angular frequency of the rotor currents as a function of reference values for the flux and the torque.

Figure 2:
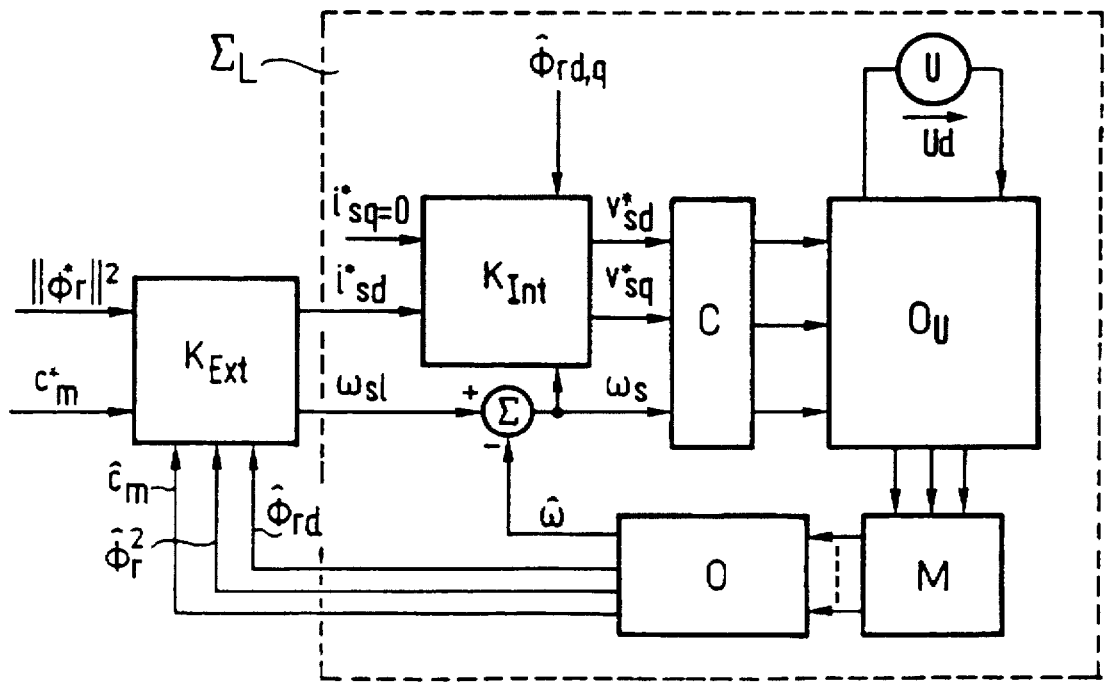
FIG. 2 is an overall diagram of a known structure for controlling electromagnetic torque comprising an assembly $\Sigma_L$ based on a voltage actuator $U_d$ and a corrector $K_{ext}$ of the invention.

FIG. 2 is an overall diagram of a known structure for apparatus for controlling electromagnetic torque, comprising an assembly $\Sigma_L$ based on a voltage actuator $U_d$ and a corrector $K_{ext}$ of the invention.

The overall diagram shown in FIG. 2 differs from the overall diagram shown in FIG. 1 in that the asynchronous machine M is powered by means of a voltage inverter $O_u$ controlled by a voltage power supply $U_d$ and current looped by a corrector $K_{int}$ disposed in cascade with the corrector $K_{ext}$.

The corrector of the invention for controlling the electromagnetic torque of an asynchronous machine is based on initializing the d-axis of the rotating two-phase frame of reference on the stator current vector of the asynchronous machine.

As mentioned above, it results from such initialization and from the fact that the d-axis and the q-axis of the rotating two-phase frame of reference are in quadrature, that the value of the component on the q-axis of the stator current, written $i_{sq}$ is zero, $i_{sq}=0$, as is its time derivative, $di_{sq}/dt=0$.

By introducing the fact that the value of the component on the q-axis of the stator current $i_s$ is zero into the equations for transient conditions in the asynchronous machine, a linearizing control relationship is obtained for controlling the modulus of the rotor flux as given by the following expression in reduced values:

$$i_{sd}^* = \frac{1}{x_m} \frac{\phi_r^{2*}}{\phi_{rd}}$$

in which:

$i_{sd}^*$ is the stator current reference value on the d-axis;

$\phi_r^{2*}$ is the reference value for the modulus of the rotor flux;

$\phi_{rd}$ is the d-component of the rotor flux; and $x_m$ is the [magnetizing or] mutual inductance.

Given the regulation that it is desired to apply to the rotor flux, it is important to determine the regulation to be applied to the torque of the asynchronous machine.

The expression for the dynamic behavior of the torque that takes account of rotor flux regulation is then defined as follows:

$$\frac{dC_m}{dt} = -\frac{1}{\tau_r} \left\{ \frac{\phi_r^{2*}}{\phi_{rd}^2} \right\} C_m + \frac{\omega_{sN}\phi_r^{2*}}{x_r} \left\{ \frac{\phi_r^{2*}}{\phi_{rd}^2} \right\} \omega_{sl}$$

in which:

$C_m$ is the electromagnetic torque;

$\omega_{sN}$ is the nominal stator angular frequency;

$\omega_{sl}$ is the angular frequency of the rotor currents;

$\tau_r$ is the rotor time constant; and $x_r$ is the rotor reactance.

Figure 3:
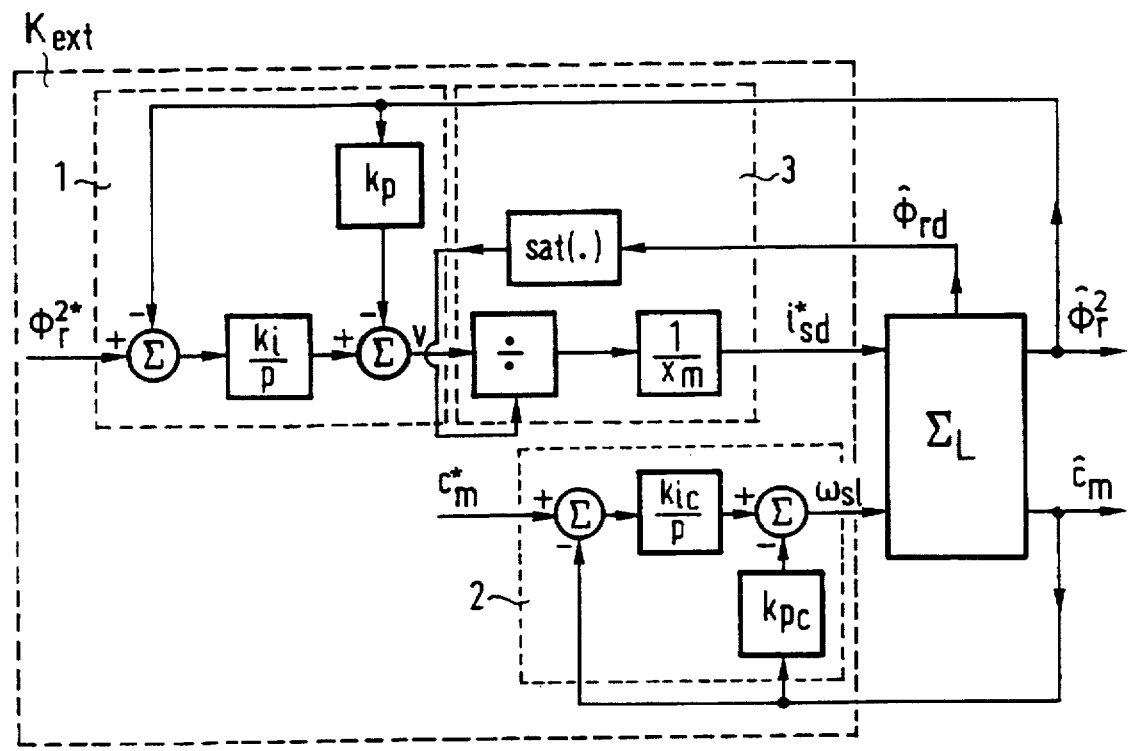
FIG. 3 is a diagram showing a first preferred embodiment of a corrector of the invention for controlling the electromagnetic torque of an asynchronous machine, the corrector comprising a flux corrector loop of the type that is non-linear overall and a torque correction loop of the linear type.

FIG. 3 is a diagram showing a first preferred embodiment of the corrector of the invention for controlling the electromagnetic torque of an asynchronous machine, the corrector comprising a flux correction loop of the non-linear type and a torque correction loop of the linear type.

The flux correction loop comprises a regulator circuit 3 for regulating the rotor magnetic flux $\phi_r$ under non-linear control making use of input/output linearization by static looping, as defined by the following equation:

$$i_{sd}^* = \frac{1}{x_m} \frac{\phi_r^{2*}}{\phi_{rd}}$$

in which:

$i_{sd}^*$ is the stator current reference value on the d-axis;

$\phi_r^{2*}$ is the reference value for the modulus of the rotor flux;

$\phi_{rd}$ is the d-component of the rotor flux;

$x_m$ is the [magnetizing or] mutual inductance; and in which the output controls the d-component of the stator current $I_s^*$.

This flux correction loop can also include a first linear corrector 1 of the proportional, integral type whose output y is the input to the regulator circuit 3.

As shown in FIG. 3, the first linear corrector 1 of the proportional, integral type, is preferably a linear corrector of the proportional, integral, "without zero" type.

A corrector of the proportional, integral, "without zero" type is a corrector of the proportional, integral type which guarantees a closed loop transfer function relative to the reference that does not present overshoot on a step response.

The torque correction loop comprises a second linear corrector 2 of the proportional, integral type, preferably "without zero", whose output controls the angular frequency of the rotor currents $\omega_{sl}$.

Figure 4:
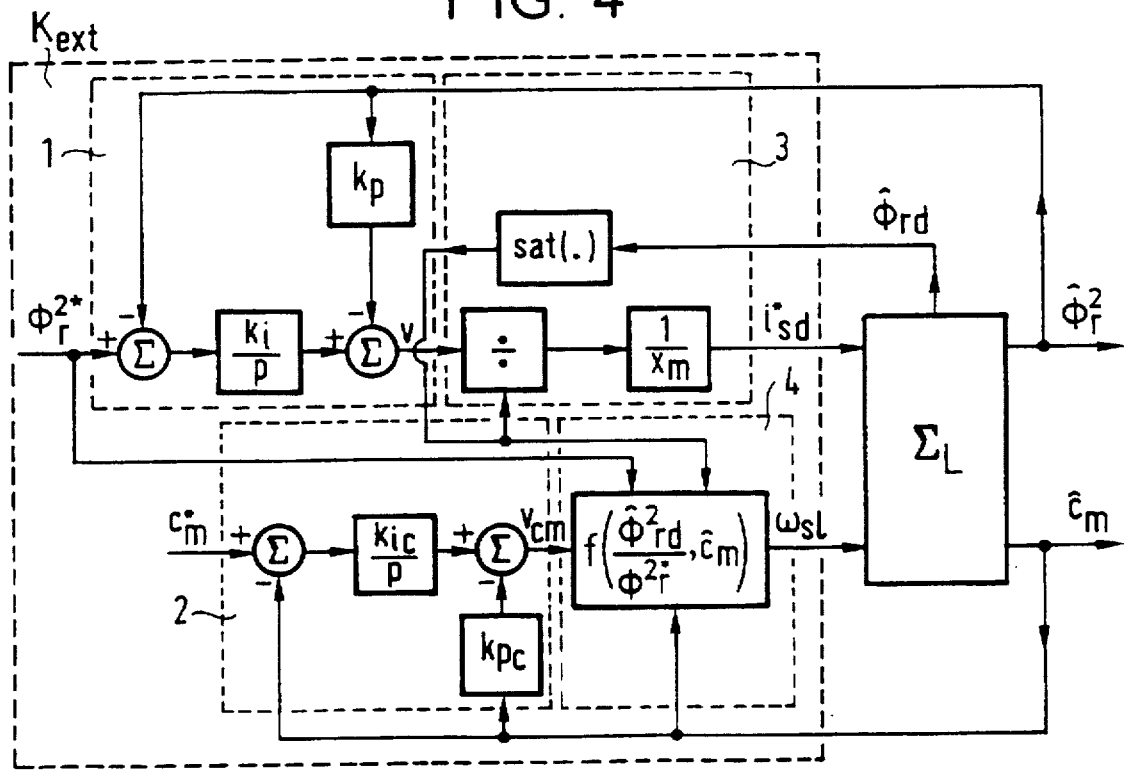
FIG. 4 is a diagram showing a second preferred embodiment of a corrector of the invention for controlling the electromagnetic torque of an asynchronous machine, the corrector comprising a flux correction loop and a torque correction loop that are both of the type that is non-linear overall.

FIG. 4 is a diagram showing a second preferred embodiment of the corrector of the invention for controlling the electromagnetic torque of an asynchronous machine, which corrector comprises a flux correction loop and a torque correction loop, both of which are of the overall non-linear type.

The diagram illustrating this second preferred embodiment of the corrector of the invention for controlling the electromagnetic torque of an asynchronous machine differs from the diagram illustrating the first preferred embodiment in that the second corrector 2 further includes a non-linearizing control circuit 4.

The non-linearizing control circuit 4 is defined by the following equation:

$$\omega_{sl} = \left\{ \frac{A_c^*}{B_c} \left(\frac{1}{\theta}\right) - \frac{A_c}{B_c} \right\} C_m + \frac{B_c^*}{B_c} \left(\frac{1}{\theta}\right) v_{cm}$$

$$\theta = \frac{\phi_r^{2*}}{\phi_{rd}^2}, A_c^* = -\frac{1}{\tau_r}, B_c^* = \frac{1}{\tau_r}$$

with $$A_c = -\frac{1}{\tau_r}, B_c = \frac{\omega_{SN}\phi_r^{2*}}{\tau_r}$$

in which:

$\theta$ is the parameter characterizing the operating point in torque;

$v_{cm}$ is the input of said corrector;

$\tau_r$ is the rotor time constant;

$\omega_{SN}$ is the nominal stator angular frequency;

$x_r$ is the rotor reactance; and the input thereof is defined by the output $v_{cm}$ of said second corrector and its output controls the angular frequency of the rotor currents $\omega_{sl}$.

It stems from the above that the merit of the Applicant is to propose a corrector for controlling the electromagnetic torque of an asynchronous machine in which the modulus of the rotor flux is controlled by non-linear action on the d-component of the stator current and in which the torque is controlled by a corrector of the proportional, integral, "with-out zero" type by acting on the angular frequency of the rotor currents $\omega_{sl}$, in combination with a linearizing control relationship.

Whichever embodiment is considered, the flux regulator circuit 3 is advantageously defined by the equation:

$$i_{sd}^* = \frac{1}{x_m} \frac{\phi_r^{2*}}{sat(\hat{\phi}_{rd})}$$

in which the function $sat(\hat{\phi}rd)$ is a non-linear limiting function defined by the following system of equations:

$$sat(\hat{\phi}_{rd}) = \begin{cases} \hat{\phi}_{rd} & \text{if } \hat{\phi}_{rd} > \phi_{rdmin} \\ \phi_{rdmin} & \text{if } \hat{\phi}_{rd} \leq \phi_{rdmin} \end{cases}$$

with $$\phi_{rdmin} = \frac{1}{x_m} \frac{\phi_{rN}^2}{I_{smax}}$$

in which:

$\phi_{rN}^2$ is the nominal rotor flux;

$I_{smax}$ is the maximum current that can be accepted by the converter and/or the asynchronous machine.

The flux regulator circuit 3 may also be defined by the following equation:

$$i_{sd}^* = \frac{1}{x_m(\phi_r^{2*}, \hat{i}_{mr})} \frac{\phi_r^{2*}}{sat(\hat{\phi}_{rd})}$$

in which $\hat{i}_{mr}$ is the estimate of the magnetizing current; and $x_m(\phi_r^{2*}, \hat{i}_{mr})$ is a function that results from identification of the static characteristic of magnetization.

The output from each of the first and second correctors 1 and 2 is preferably the difference between a proportional action and an integral action. The integral action is the result of a difference weighted by a gain $k_{i_f}$ (or $k_{i_c}$) between the reference $\phi_r^{2*}$ and the estimated flux $\hat{\phi} r^2$ (or between $C_m^*$ and the estimated torque $\hat{C} m$), and the proportional action that results from weighting the estimated flux $\hat{\phi} r^2$ by a gain $k_p$, (or weighting the estimated torque $\hat{C} m$ by the gain $k_{pc}$).

As mentioned above, the present invention also relates to apparatus for controlling the electromagnetic torque of an asynchronous machine by regulating the magnetic flux $\phi$ and by controlling the electromagnetic torque $C_m$, the apparatus being constituted by control eans associated with a power supply source and a corrector $K_{ext}$, the corrector $K_{ext}$ being defined as specified above.

Finally, the invention also relates to a method of controlling the electromagnetic torque of an asynchronous machine by regulating the magnetic flux $\phi$ and by controlling the electromagnetic torque $C_m$ by means of apparatus constituted by control means associated with a power supply and a corrector $K_{ext}$ defined as specified above.

The method comprises the steps consisting in:

regulating the rotor magnetic flux $\phi_r$ by means of a non-linearly controlled regulator circuit using input/output linearization by means of a static loop;

performing integral action and then proportional action so as to obtain the input variable y of said regulator circuit; and performing integral action and then proportional action so as to control the angular frequency of the rotor currents $\omega_{sl}$.

The method may include an additional step consisting in completing the integral action and then proportional action for controlling the angular frequency of the rotor currents $\omega_{sl}$ by a linearizing control relationship so as to be unaffected by variations in the operating point of the asynchronous machine.

The method may also include a step consisting in fixing a maximum current value while the asynchronous machine is starting or while it is operating under defluxed conditions.

The method may also include a step consisting in adapting the static mutual reactance $x_m$ in such a manner as to be unaffected by variation therein while the asynchronous machine is operating under defluxed conditions.

I claim:

1. Apparatus for controlling the electromagnetic torque of an asynchronous machine by regulating magnetic flux $\phi$ and by controlling electromagnetic torque $C_m$, said apparatus including a corrector $K_{ext}$ characterized by:

a regulator circuit (3) for regulating the rotor magnetic flux $\phi_r$ having non-linear control using input/output linearization by static looping, defined by the equation:

$$i_{sd}^* = \frac{1}{x_m} \frac{\phi_r^{2*}}{\phi_{rd}}$$

in which: $i_{sd}^*$ is the stator current reference value on the d-axis, $\phi_r^{2*}$ is the reference value for the modulus of the rotor flux, $\phi_{rd}$ is the d-component of the rotor flux, and $x_m$ is the mutual inductance, and in which the output controls the d-component of the stator current $i_s^*$;

a first linear corrector (1) of the proportional, integral type whose output v is the input of said regulator circuit; and a second linear corrector (2) of the proportional, integral type whose output controls the angular frequency of the rotor currents $\omega_{sl}$.

2. Apparatus according to claim 1, in which said second linear corrector further includes a non-linearizing control circuit (4) defined by the equation:

$$\omega_{sl} = \left\{ \frac{A_c^*}{B_c} \left( \frac{1}{\theta} \right) - \frac{A_c}{B_c} \right\} C_m + \frac{B_c^*}{B_c} \left( \frac{1}{\theta} \right) v_{cm}$$

$$\theta = \frac{\phi_r^{2*}}{\phi_{rd}^2}, A_c^* = -\frac{1}{\tau_r}, B_c^* = \frac{1}{\tau_r}$$

with $$A_c = -\frac{1}{\tau_r}, B_c = \frac{\omega_{sN}\phi_r^{2*}}{\tau_r}$$

in which:

$\theta$ is the parameter characterizing the operating point in torque;

$v_{cm}$ is the input of said second linear corrector;

$\tau_r$ is the rotor time constant;

$\omega_{sN}$ is the nominal stator angular frequency;

$x_r$ is the rotor reactance; and the input of said non-linearizing control circuit is defined by the output $v_{cm}$ of said second linear corrector and its output controls the angular frequency of the rotor currents $\omega_{sl}$.

3. Apparatus according to claim 1, in which said flux regulator circuit is defined by the equation:

$$i_{sd}^* = \frac{1}{x_m} \frac{\phi_r^{2*}}{sat(\hat{\phi}_{rd})}$$

in which the function sat $(\hat{\phi}_{rd})$ is a non-linear limiting function defined by the following system of equations:

$$sat(\hat{\phi}_{rd}) = \begin{cases} \hat{\phi}_{rd} & \text{if } \hat{\phi}_{rd} > \phi_{rdmin} \\ \phi_{rdmin} & \text{if } \hat{\phi}_{rd} \leq \phi_{rdmin} \end{cases}$$

with $$\phi_{rdmin} = \frac{1}{x_m} \frac{\phi_{rN}^2}{I_{smax}}$$

in which:

$\phi_{rN}^2$ is the nominal rotor flux; and $I_{smax}$ is the maximum current that can be accepted by the asynchronous machine.

4. Apparatus according to claim 1, in which the flux regulator circuit is defined by the equation;

$$i_{sd}^* = \frac{1}{x_m(\phi_r^{2*}, \hat{i}_{mr})} \frac{\phi_r^{2*}}{sat(\hat{\phi}_{rd})}$$

in which:

$\hat{i}_{mr}$ is the estimate of the magnetizing current; and $x_m(\phi_r^{2*}, \hat{i}_{mr})$ is a function that results from identification of the static characteristic of magnetization.

5. Apparatus according to claim 1, in which the output of each of the first and second correctors is the difference between a proportional action and an integral action, said integral action being the result of taking the difference between the reference $\phi_r^{2*}$ and an estimated flux $\hat{\phi}_r^2$ and weighting it by a gain $k_i$ or taking the difference between a reference $C_m^*$ and an estimated torque $\hat{C}_m$ and weighting it by a gain $k_{ic}$, and said proportional action being the result of weighting the estimated flux $\hat{\phi}_r^2$ by a gain $k_p$ or weighting the estimated torque $\hat{C}_m$ by a gain $k_{pc}$.

6. Apparatus according to claim 1, further including control means associated with a power source.

7. Apparatus according to claim 6, in which said asynchronous machine is controlled by a voltage power supply, with said voltage power supply being current looped by a further corrector $K_{int}$ disposed in cascade with said corrector $K_{ext}$.

8. A method of controlling the electromagnetic torque of an asynchronous machine by regulating the magnetic flux $\phi$ and by controlling the electromagnetic torque $C_m$, the method using apparatus constituted by control means associated with a power source and with a corrector $K_{ext}$ comprising a regulator circuit (3) for regulating the rotor magnetic flux $\phi_r$ having non-linear control using input/output linearization by static looping, defined by the equation:

$$i_{sd}^* = \frac{1}{x_m} \frac{\phi_r^{2*}}{\phi_{rd}}$$

in which: $i_{sd}^*$ is the stator current reference value on the d-axis, $\phi_r^{2*}$ is the reference value for the modulus of the rotor flux, $\phi_{rd}$ is the d-component of the rotor flux, and $x_m$ is the magnetizing or mutual inductance; and in which the output controls the d-component of the stator current $i_s^*$; a first linear corrector (1) of the proportional, integral type whose output v is the input of said regulator circuit; and a second linear corrector (2) of the proportional, integral type whose output controls thie angular frequency of the rotor currents $\omega_{sl}$, said method being characterized in that it comprises the steps of:

regulating the rotor magnetic flux $\phi$, by means of a non-linearly controlled regulator circuit using input/output linearization by means of a static loop;

performing integral action and then proportional action so as to obtain the input variable v of said regulator circuit; and performing integral action and then proportional action so as to control the angular frequency of the rotor currents $\omega_{s1}$.

9. A method according to claim 8, including an additional step of completing said integral then proportional action for controlling said angular frequency of the rotor currents $\omega_{s1}$ by a linearizing control relationship in such a manner as to be unaffected by variations in the operating point of said asynchronous machine.

10. A method according to claim 8, including a step of fixing a maximum current value while starting said asynchronous machine or while operating under defluxed conditions.

11. A method according to claim 8, including a step of adapting the static mutual reactance $x_m$ in such a manner as to be unaffected by variation therein during operation of said asynchronous machine under defluxed conditions.

* * * * *